3,795,674
CERTAIN 2-SUBSTITUTED-4,6-DIAMINO-5-
PYRIMIDINECARBOXALDEHYDES
Arthur A. Santilli, Havertown, and Dong H. Kim, Wayne,
Pa., assignors to American Home Products Corporation, New York, N.Y.
No Drawing. Original application June 18, 1970, Ser. No. 47,571, now Patent No. 3,725,405. Divided and this application Aug. 7, 1972, Ser. No. 278,316
Int. Cl. C07d 51/42
U.S. Cl. 260—256.4 N     3 Claims

ABSTRACT OF THE DISCLOSURE

Novel 2,4,7 - trisubstituted-pyrido[2,3-d]pyrimidine-6-carboxamides have been produced which have central nervous system depressant activity and are useful pharmacological agents in the calming of animals.

This is a division of Ser. No. 47,571, which was filed on June 18, 1970, and is now U.S. Pat. No. 3,725,405.

DESCRIPTION OF THE INVENTION

The invention is concerned with compounds of Formula I

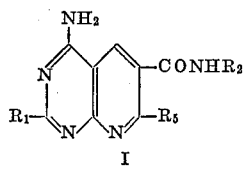

wherein $R_1$ is selected from the group consisting of phenyl, halophenyl, (lower)alkoxyphenyl, (lower)alkylphenyl and (lower)alkylthio; $R_2$ is selected from the group consisting of (lower)alkoxyethyl, hydroxy(lower)alkyl, (lower)alkoxycarbonylmethyl, phenethyl, halophenethyl, (lower)alkoxyphenethyl, (lower)alkylphenethyl, and

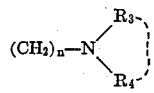

wherein $R_3$ and $R_4$ when not concatenated are independently selected from the group consisting of hydrogen, (lower)alkyl and (lower)alkoxy; when $R_3$ and $R_4$ are concatenated they form a radical selected from the group consisting of morpholino, piperazinyl, imidazolinyl and pyrrolidinyl; $n$ is an integer of from 1 to about 4; $R_5$ is selected from the group consisting of hydroxy and amino.

Also within the scope of the invention are the novel compounds of Formula II which are intermediates in the synthesis of the valuable pharmacological agents of Formula I.

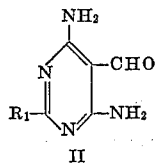

wherein $R_1$ is the same as hereinabove described.

When used herein and in the appended claims, the term "(lower)alkyl" contemplates hydrocarbon radicals, straight and branched, of from about 1 to about 6 carbon atoms; illustrative members of the group being methyl, ethyl, n-propyl, i-propyl, n-butyl; t-butyl, n-pentyl, n-hexyl and the like. The term "(lower)alkoxy" contemplates hydrocarbonoxy groups of from about 1 to about 6 carbon atoms, straight chain and branched, and includes methoxy, ethoxy, n-propoxy, i-propoxy, n-butoxy, t-butoxy, n-pentoxy, n-hexyloxy and the like. The compounds of Formula II may be prepared by treating the appropriate 4,6-dichloro, 2-substituted pyrimidine with concentrated ammonium hydroxide solution in the presence of a lower alkanol such as methanol, ethanol or propanol. The reaction mixture is heated for about one hour and then cooled. To prepare compounds of Formula I, the recrystallized product thus obtained is combined in ethanolic sodium ethoxide which has been prepared by the addition of sodium metal to an excess of ethanol. Then the appropriate 2-cyano-N-substituted acetamide or N,N'-bis(substituted)malonamide is added and the reaction mixture is refluxed and the 2,4,7-trisubstituted-pyrido-[2,3-d]pyrimidine-6-carboxamides are then recovered from the reaction mixture.

Two methods are useful for the isolation of the products from the reaction mixture. It may be possible to separate the product by filtering the precipitate that readily forms in the heated reaction mixture. As an alternative method it may be necessary to cool the reaction mixture in ice to separate the product as a crystalline precipitate. The product may then be purified by recrystallization from ethanol, aqueous dimethylformamide etc.

The starting materials for the preparation of Formula II are commercially available or may be prepared by techniques well known to those skilled in the art.

In the pharmacological evaluation of the biological activity of the compounds of this invention, the in vivo effects were tested as follows.

The compound was administered orally or intraperitoneally to three mice (14 to 24 grams) at each of the following doses: 400, 127, 40 and 12.7 milligrams per kilogram of host body weight (MPK). The animals were watched for a minimum of two hours during which time signs of general stimulation (i.e., increased spontaneous motor activity, hyperactivity on tactile stimulation, twitching), general depression (i.e., decreased spontaneous motor activity, decreased respiration), autonomic activity (i.e., miosis, mydriasis, diarrhea) were noted.

The compounds of this invention induce central nervous system depressant effects at a dose of 127 to 400 MPK. Thus, the compounds of the invention have demonstrated utility as pharmacologically active compounds in experimental and comparative pharmacology and are of value in the treatment of mammals, e.g. mice, rats, etc., who are responsive to treatment with central nervous depressant agents. Specifically the compounds may be administered for the purpose of inducing a calming effect in mammals.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, calcium carbonate and the like. They may be administered orally in the form of solutions which may contain coloring and flavoring agents or they may be administered by parenteral injection, e.g., intramuscular injection. The injectionable solution may contain other solutes such as sodium chloride or glucose in a sufficient quantity to render the solution isotonic.

The dosage of the pharmacological therapeutic agents of the invention will vary with the route of administration and the particular compound chosen. Furthermore, it will vary with the particular subject under treatment. Generally, treatment is initiated with small dosages substantially less than the optimum dose of the compound. Thereafter, the dosage may be increased by small increments until the optimum effect under the circumstances is reached.

While the invention has been described in its broadest form hereinabove, the following examples are added to set forth specific embodiments of the methods of preparing the compounds of the invention.

EXAMPLE I 4,6-diamino-2-phenyl-5-pyrimidenecarboxaldehyde

To 50 ml. of concentrated ammonium hydroxide solution in a pressure flask is added 15 g. of 4,6-dichloro-2-phenyl - 5 - pyrimidinecarboxaldehyde. The mixture is heated on a steam bath for one hour and a sufficient quantity of ethanol is added to solubilize the mixture. Heating is continued for an additional hour. The reaction is cooled in ice and the crystalline product that is deposited (9.5 g.) is recrystallized from ethanol. The product has a M.P. of 217–218° C.

*Analysis.*—Calcd. for $C_{11}H_{10}N_4O$ (percent): C, 61.67; H, 4.71; N, 26.16. Found (percent): C, 61.50; H, 4.40; N, 26.13.

EXAMPLE II 4,6-diamino - 2 - methylthio-5-pyrimidinecarboxaldehyde is prepared as in Example I from 15 g. of 4,6-dichloro-2-methylthio-5-pyrimidinecarboxaldehyde in 80 ml. of concentrated ammonium hydroxide. The product amounts to 10 g. Recrystallization from ethanol yields an analytical sample, M.P. 228–230° C.

*Analysis.*—Calcd. for $C_6H_8N_4OS$ (percent): C, 39.12; H, 4.37; N, 30.41; S, 17.40. Found (percent): C, 39.08; H, 4.38; N, 30.06; S, 17.15.

EXAMPLE III 4,7-diamino-N-cyclohexyl-2-(methylthio)pyrido[2,3-d]pyridine-6-carboxamide To a solution of 0.23 g. of sodium metal in ethanol is added 1.84 g. of 4,6-diamino-2-methylthio-5-pyridinecarboxaldehyde and 1.6 g. of 2-cyano-N-cyclohexyl acetamide. The reaction mixture is heated with stirring under reflux for 30 minutes during which time a yellow crystalline product is deposited. Recrystallization from aqueous dimethylformamide yields 0.5 g. of product, M.P. >360°.

*Analysis.*—Calcd. for $C_{15}H_{19}N_6OS$ (percent): C, 54.36; H, 5.78; N, 25.36; S, 9.67. Found (percent): C, 54.07; H, 6.04; N, 24.97; S, 9.36.

EXAMPLE IV 4,7-diamino-N-(2-dimethylaminoethyl)-2-(methylthio)pyrido[2,3-d]pyrimidine-6-carboxamide To a solution of 0.23 g. of sodium in absolute ethanol is added 1.2 g. of 4,6-diamino-2-methylthio-5-pyrimidinecarboxaldehyde and 1.1 g. of 2 - cyano-N-(2-dimethylaminoethyl)acetamide. The reaction mixture is heated under reflux for 2 hours and allowed to stand overnight in the refrigerator. A yellow crystalline product is deposited. Recrystallization from ethanol yields 0.3 g. of product, M.P. 297–300° C.

*Analysis.*—Calcd. for $C_{13}H_{19}N_7OS$ (percent): C, 48.58; H, 5.96; N, 30.51; S, 9.97. Found (percent): C, 48.52; H, 5.85; N, 30.45; S, 9.99.

EXAMPLE V 4,7-diamino-N-(2-methoxyethyl)-2-phenylpyrido[2,3-d]pyrimidine-6-carboxamide To 0.69 g. of sodium in 100 ml. of ethanol is added 6.12 g. of 4,6-diamino-2-phenyl-5-pyrimidinecarboxaldehyde and 4.26 g. of 2-cyano-N-(2-methoxyethyl)acetamide. The reaction mixture is heated under reflux with stirring for one hour. After cooling in ice a precipitate is deposited. Recrystallization from ethanol yields 1.0 g. of product, M.P. 258–261° C.

*Analysis.*—Calcd. for $C_{17}H_{18}N_6O_2$ (percent): C, 60.34; H, 5.36; N, 24.84. Found (percent): C, 60.08; H, 5.26; N, 24.90.

EXAMPLE VI 4,7-diamino-N-(2-morpholinoethyl)-2-phenylpyrido[2,3-d]pyrimidine-6-carboxamide To 0.69 g. of sodium in 100 ml. of ethanol is added 6.12 g. of 4,6-diamino-2-phenyl-5-pyrimidinecarboxaldehyde and 5.92 g. of 2-cyano-N-(2-morpholinoethyl)acetamide. The reaction mixture is heated under reflux for 20 minutes during which time a yellow precipitate is deposited. The reaction mixture is cooled in ice and filtered. The filter cake amounts to 5.9 g. Recrystallization from aqueous dimethylformamide yields 5 g. of product, M.P. 299–300° C.

*Analysis.*—Calcd. for $C_{20}H_{23}N_7O_2$ (percent): C, 61.05; H, 5.89; N, 24.92. Found (percent): C, 61.17; H, 5.95; N, 24.87.

EXAMPLE VII 4-amino-7-hydroxy-N-(2-methoxyethyl)-2-phenylpyrido[2,3-d]pyrimidine-6-carboxamide To a solution containing 0.69 g. of sodium in 60 ml. of absolute ethanol is added 6.1 g. of 4,6-diamino-2-phenyl-5-pyrimidinecarboxaldehyde and 5.9 g. of N,N'-bis(2-methoxyethyl)malonamide. The reaction mixture is heated under reflux with stirring for 3 hours and then cooled in ice. The yellow precipitate which is deposited is collected on a filter and recrystallized from aqueous dimethylformamide. The product amounts to 2 g., M.P. >360°.

*Analysis.*—Calcd. for $C_{17}H_{17}N_5O_6$ (percent): C, 60.17; H, 5.05; N, 20.64. Found (percent): C, 59.60; H, 4.94; N, 20.79.

EXAMPLE VIII

By methods analagous to those employed above, the following compounds are prepared:

| $R_1$ | $R_2$ | $R_5$ |
|---|---|---|
| Cl—⟨phenyl⟩— | Cl—⟨phenyl⟩—CH$_2$—CH$_2$— | —NH$_2$ |
| CH$_3$O—⟨phenyl⟩— | CH$_3$—⟨phenyl⟩—CH$_2$—CH$_2$— | —OH |
| F—⟨phenyl⟩— | CH$_3$O—⟨phenyl⟩—CH$_2$—CH$_2$— | —NH$_2$ |
| Br—⟨phenyl⟩— | ⟨phenyl⟩—CH$_2$—CH$_2$— | CH$_3$—NH— |

TABLE—Continued

| R₁ | R₂ | R₅ |
|---|---|---|
| $CH_3-CH_2-S-$ | $CH_3O-CH_2-CH_2-$ | $-NH_2$ |
| $CH_3-\text{C}_6\text{H}_4-$ | $CH_3-CH_2-\text{C}_6\text{H}_4-$ | $-NH_2$ |
| $CH_3-CH_2-\text{C}_6\text{H}_4-$ | $-CH_2-CH_2-N(CH_3)_2$ | $-NH_2$ |
| $CH_3-S-$ | $-CH_2-CH_2-N(C_2H_5)_2$ | $-NH_2$ |
| $\text{(3-Cl-C}_6\text{H}_4)-$ | $-CH_2-CH_2-CH_2-N(CH_2CH_3)_2$ | $-NH_2$ |
| $CH_3-CH_2-O-\text{C}_6\text{H}_4-$ | $-CH_2-CH_2-\text{(piperazinyl)}$ | $-NH_2$ |
| $CH_3-CH_2-CH_2-S-$ | $-CH_2-CH_2-\text{(piperidinyl)}$ | $-NH_2$ |
| $CH_3-CH_2-CH_2-\text{C}_6\text{H}_4-$ | $-CH_2-CH_2-\text{(pyrrolidinyl)}$ | $-OH$ |
| $\text{(2-Cl-C}_6\text{H}_4)-$ | | $-NH_2$ |

We claim:

1. A compound selected from the group consisting of:

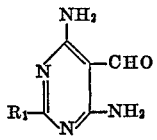

wherein R₁ is selected from the group consisting of phenyl, halophenyl, (lower)alkoxyphenyl, (lower)alkylphenyl and (lower)alkylthio.

2. A compound as described in claim 1 which is: 4,6-diamino-2-phenyl-5-pyrimidinecarboxaldehyde.

3. A compound as defined in claim 1 which is: 4,6-diamino-2-methylthio-5-pyrimidinecarboxaldehyde.

References Cited

UNITED STATES PATENTS 3,631,045   12/1971   Kim et al. _____ 260—256.4 N

OTHER REFERENCES

O'Brien et al.: Chem. Abstracts, 69:27369 (1968).

RICHARD J. GALLAGHER, Primary Examiner

U.S. Cl. X.R.

260—256.5 R